United States Patent
Rodrigues et al.

(10) Patent No.: US 11,609,421 B2
(45) Date of Patent: Mar. 21, 2023

(54) FLUID FILLED ACTIVE METASURFACE

(71) Applicant: Toyota Motor Engineering & Manufacturing North America, Inc, Plano, TX (US)

(72) Inventors: Sean P. Rodrigues, Ann Arbor, MI (US); Ercan M. Dede, Ann Arbor, MI (US); Paul D. Schmalenberg, Pittsburg, PA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 62 days.

(21) Appl. No.: 17/227,794

(22) Filed: Apr. 12, 2021

(65) Prior Publication Data

US 2022/0326504 A1 Oct. 13, 2022

(51) Int. Cl.
*G02B 26/00* (2006.01)
*G02B 1/00* (2006.01)

(52) U.S. Cl.
CPC .......... *G02B 26/004* (2013.01); *G02B 1/002* (2013.01); *G02F 2202/30* (2013.01)

(58) Field of Classification Search
CPC .... G02B 1/002; G02B 26/004; G02F 2202/30
USPC ................................................. 359/290–291
See application file for complete search history.

(56) References Cited

U.S. PATENT DOCUMENTS

| | | |
|---|---|---|
| 2018/0143470 A1 | 5/2018 | Oh et al. |
| 2018/0358690 A1 | 12/2018 | Linn et al. |
| 2019/0379111 A1 | 12/2019 | Varel et al. |
| 2020/0287283 A1 | 9/2020 | Medhipour et al. |

FOREIGN PATENT DOCUMENTS

| | | |
|---|---|---|
| CN | 102736274 A | 10/2012 |
| CN | 108376839 A | 8/2018 |
| CN | 209766650 U | 12/2019 |

(Continued)

OTHER PUBLICATIONS

V. Dorodnitsyn et al. "Two-dimensional fluid-filled closed-cell cellular solid as an acoustic metamaterial with negative index," American Physical Society, Physical Review B 93, Apr. 1, 2016, 5 pages.

(Continued)

*Primary Examiner* — Mahidere S Sahle
(74) *Attorney, Agent, or Firm* — Jordan IP Law, LLC

(57) ABSTRACT

A tunable optical metamaterial system includes a tunable optical metamaterial, an actuator module to selectively activate the tunable optical metamaterial, and a control system to selectively control the actuator module. The tunable optical metamaterial includes a substrate defined by one or more fluid-filled pockets formed by one or more electroactive polymer (EAP) layers defining a reservoir containing a fluid that is induced to a change in volumetric configuration or 3D orientation when electrically activated. The optically active array of resonators are populated on an electroactive surface of the one or more fluid-filled pockets and are optically responsive to the change in volumetric configuration of the one or more fluid-filled pockets. The control module is to selectively control, via the actuator module, the optical properties of the tunable optical metamaterial by causing the electrical activation of the fluid-filled pockets.

20 Claims, 7 Drawing Sheets

(56) References Cited

FOREIGN PATENT DOCUMENTS

| | | |
|---|---|---|
| CN | 111524497 A | 8/2020 |
| WO | 2019237765 A1 | 12/2019 |

OTHER PUBLICATIONS

"Sample records for optical negative-index metamatericals," https://www.science.gov/topicpages/o/optical+negativeindex+metamaterials.html, retrieved Apr. 9, 2021,186 pages.

Ghosh et al., "Fluidically Switchable Metasurface for Wide Spectrum Absorption," Scientific Reports 8, Article No. 10169, Jul. 5, 2081, 28 pages.

FLUID FILLED ACTIVE METASURFACE

TECHNICAL FIELD

Embodiments relate generally to tunable optical metamaterials. The tunable optical metamaterials include one or more fluid filled packets providing additional shape changing capabilities for expanded tuning functionality.

BACKGROUND

Optical metamaterials generally include arrays of resonators that are separated from one another by less than a wavelength of incoming light that interacts with the metamaterials. Metamaterials generally have resonators that have spatially varying geometric parameters (e.g., the resonators may have spatially varying size, shape, or spacing) to generate a desired optical response. Existing optical metamaterial designs, however, fail to provide a built-in method and structure for active, electronic tuning.

BRIEF SUMMARY

In accordance with one or more embodiments, an example tunable optical metamaterial system comprises one or more of the following: a tunable optical metamaterial; an actuator module to selectively activate the tunable optical metamaterial; and a control system to selectively control the actuator module.

In accordance with one or more embodiments of the example tunable optical metamaterial system, the tunable optical metamaterial comprises a substrate having an electroactive surface and an optically active array of resonators populated on the electroactive surface.

In accordance with one or more embodiments of the example tunable optical metamaterial system, the substrate is defined by one or more fluid-filled pockets formed by one or more electroactive polymer (EAP) layers defining a reservoir containing a fluid that is induced to a change in volumetric configuration or 3D orientation when electrically activated.

In accordance with one or more embodiments of the example tunable optical metamaterial system, the optically active array of resonators are optically responsive to the change in the volumetric configuration or 3D orientation of the one or more fluid-filled pockets.

In accordance with one or more embodiments of the example tunable optical metamaterial system, the actuator module comprises one or more electrical conductor members electrically coupled to the one or more fluid-filled pockets, to serve as a voltage source which electrically activates the one or more fluid-filled pockets.

In accordance with one or more embodiments of the example tunable optical metamaterial system, the control module comprises one or more processors to execute a set of instructions to selectively control the optical properties of the tunable optical metamaterial by causing the electrical activation of the fluid-filled pockets.

In accordance with one or more embodiments of the example tunable optical metamaterial system, the one or more processors are to execute the set of instructions to selectively cause the actuator module to apply a predetermined one or more voltages to electrically activate the one or more fluid-filled pockets.

In accordance with one or more embodiments of the example tunable optical metamaterial system, the one or more processors are to execute the set of instructions to selectively cause the actuator module to apply the predetermined one or more voltages to expand the one or more fluid-filled pockets in a direction dependent upon an orientation of polymer fibers of the EAP.

In accordance with one or more embodiments of the example tunable optical metamaterial system, the one or more fluid-filled pockets are formed by an electroactive polymer layer and a non-electroactive polymer layer.

In accordance with one or more embodiments of the example tunable optical metamaterial system, the electroactive polymer layer has a concave configuration in an inactivated state of the substrate.

In accordance with one or more embodiments of the example tunable optical metamaterial system, the non-electroactive polymer layer has a convex configuration in an inactivated state of the substrate.

In accordance with one or more embodiments of the example tunable optical metamaterial system, the concave configuration and the convex configuration is respectively altered to a substantially planar configuration when the electroactive polymer layer is electrically activated.

In accordance with one or more embodiments of the example tunable optical metamaterial system, in response to a deactivation of the electroactive polymer layer, the substantially planar configuration of the electroactive polymer layer returns to the concave configuration and the substantially planar configuration of the non-electroactive polymer layer returns to the convex configuration.

In accordance with one or more embodiments of the example tunable optical metamaterial system, the optically active array of resonators comprise one or more of metal resonator nanoparticles, inorganic resonator particles, and organic resonator particles.

In accordance with one or more embodiments, a tunable optical metamaterial comprises one or more of the following: a substrate defined by one or more fluid-filled pockets formed by one or more electroactive polymer (EAP) layers defining a reservoir containing a fluid that is induced to a change in volumetric configuration or 3D orientation when electrically activated; and an optically active array of resonators populated on a surface of the one or more fluid-filled pockets, the optically active array of resonators being optically responsive to the change in volumetric configuration or 3D orientation of the one or more fluid-filled pockets.

In accordance with one or more embodiments of the tunable optical metamaterial, the one or more fluid-filled pockets are electrically activated by receipt of a predetermined one or more voltages from a voltage source. Such a source may comprise the actuator module disclosed herein.

In accordance with one or more embodiments of the tunable optical metamaterial, the application of the predetermined one or more voltages causes the one or more fluid-filled pockets to expand in a direction dependent upon an orientation of polymer fibers of the EAP.

In accordance with one or more embodiments of the tunable optical metamaterial, the one or more fluid-filled pockets are formed by an electroactive polymer layer and a non-electroactive polymer layer.

In accordance with one or more embodiments of the tunable optical metamaterial, in an inactive state of the electroactive polymer layer, the electroactive polymer layer has a concave configuration.

In accordance with one or more embodiments of the tunable optical metamaterial, in an inactive state of the electroactive polymer layer, the non-electroactive polymer layer has a convex configuration.

In accordance with one or more embodiments of the tunable optical metamaterial, in an active state of the electroactive polymer layer, the concave configuration of the electroactive polymer layer is altered to a substantially planar configuration.

In accordance with one or more embodiments of the tunable optical metamaterial, in an active state of the electroactive polymer layer, the convex configuration of the non-electroactive polymer layer is altered to a substantially planar configuration.

In accordance with one or more embodiments of the example tunable optical metamaterial, the optically active array of resonators comprise one or more of metal resonator nanoparticles, inorganic resonator particles, and organic resonator particles.

In accordance with one or more embodiments, a method of controlling a tunable optical metamaterial, the method comprising one or more of the following: forming the tunable optical metamaterial having a substrate defined by one or more fluid-filled pockets formed by one or more electroactive polymer (EAP) layers defining a reservoir containing a fluid that is induced to a change in volumetric configuration or 3D orientation when electrically activated, and an optically active array of resonators populated on a surface of the one or more fluid-filled pockets, the optically active array of resonators being optically responsive to the change in volumetric configuration or 3D orientation of the one or more fluid-filled pockets; and selectively controlling the optical properties of the tunable optical metamaterial by causing the electrical activation of the fluid-filled pockets.

In accordance with one or more embodiments of the method, the selective control of the optical properties comprises applying a predetermined one or more voltages to the one or more electroactive polymer (EAP) layers in a manner that electrically activates the one or more fluid-filled pockets.

In accordance with one or more embodiments of the method, the application of the predetermined one or more voltages causes the one or more fluid-filled pockets to expand in a direction dependent upon an orientation of polymer fibers of the EAP.

In accordance with one or more embodiments of the method, the selective control of the optical properties comprises applying the predetermined one or more voltages to the electroactive surface in a manner that expands the substrate in a second direction that is substantially perpendicular to the first direction.

In accordance with one or more embodiments of the method, the one or more fluid-filled pockets are formed by an electroactive polymer layer and a non-electroactive polymer layer.

In accordance with one or more embodiments of the method, in inactive state of the electroactive polymer layer, the electroactive polymer layer has a concave configuration.

In accordance with one or more embodiments of the method, in inactive state of the electroactive polymer layer, the non-electroactive polymer layer has a convex configuration.

In accordance with one or more embodiments of the method, in an active state of the electroactive polymer layer, the concave configuration is altered to a substantially planar configuration.

In accordance with one or more embodiments of the method, in an active state of the electroactive polymer layer, the convex configuration is altered to a substantially planar configuration.

In accordance with one or more embodiments, a computer program product for a tunable optical metamaterial having a substrate having a substrate defined by one or more fluid-filled pockets formed by one or more electroactive polymer (EAP) layers defining a reservoir containing a fluid that is induced to a change in volumetric configuration or 3D orientation when electrically activated, and an optically active array of resonators populated on a surface of the one or more fluid-filled pockets, the optically active array of resonators being optically responsive to the change in volumetric configuration or 3D orientation of the one or more fluid-filled pockets, the computer program product comprising at least one computer readable medium comprising a set of instructions, which when executed by one or more processors, cause the one or more processors to: selectively control the optical properties of the tunable optical metamaterial by causing the electrical activation of the fluid-filled pockets.

In accordance with one or more embodiments of the computer program, wherein the set of instructions, which when executed by the one or more processors, cause the one or more processors to: selectively control the optical properties of the tunable optical metamaterial by causing the application of a predetermined one or more voltages to the one or more electroactive polymer (EAP) layers in a manner that electrically activates the one or more fluid-filled pockets.

In accordance with one or more embodiments of the computer program, wherein the set of instructions, which when executed by the one or more processors, cause the one or more processors to: selectively control the optical properties of the tunable optical metamaterial by causing the application of a predetermined one or more voltages to the one or more electroactive polymer (EAP) layers in a manner that causes the one or more fluid-filled pockets to expand in a direction dependent upon an orientation of polymer fibers of the EAP.

In accordance with one or more embodiments of the computer program, wherein the set of instructions, which when executed by the one or more processors, cause the one or more processors to: selectively control the optical properties of the tunable optical metamaterial by causing the application of a predetermined one or more voltages to an electroactive polymer layer in a manner that causes the alteration of a concave configuration of the electroactive polymer layer to a substantially planar configuration.

In accordance with one or more embodiments of the computer program, wherein the set of instructions, which when executed by the one or more processors, cause the one or more processors to: selectively control the optical properties of the tunable optical metamaterial by causing the application of a predetermined one or more voltages to an electroactive polymer layer in a manner that causes the alteration of a convex configuration of a non-electroactive polymer layer to a substantially planar configuration.

In accordance with one or more embodiments of the computer program, wherein the set of instructions, which when executed by the one or more processors, cause the one or more processors to: selectively control the optical properties of the tunable optical metamaterial by causing the removal of the predetermined one or more voltages to the electroactive polymer layer in a manner that causes the alteration of the substantially planar configuration of the electroactive polymer layer to the concave configuration.

In accordance with one or more embodiments of the computer program, wherein the set of instructions, which when executed by the one or more processors, cause the one or more processors to: selectively control the optical properties of the tunable optical metamaterial by causing the removal of the predetermined one or more voltages to the electroactive polymer layer in a manner that causes the alteration of the substantially planar configuration of the non-electroactive polymer layer to the convex configuration.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
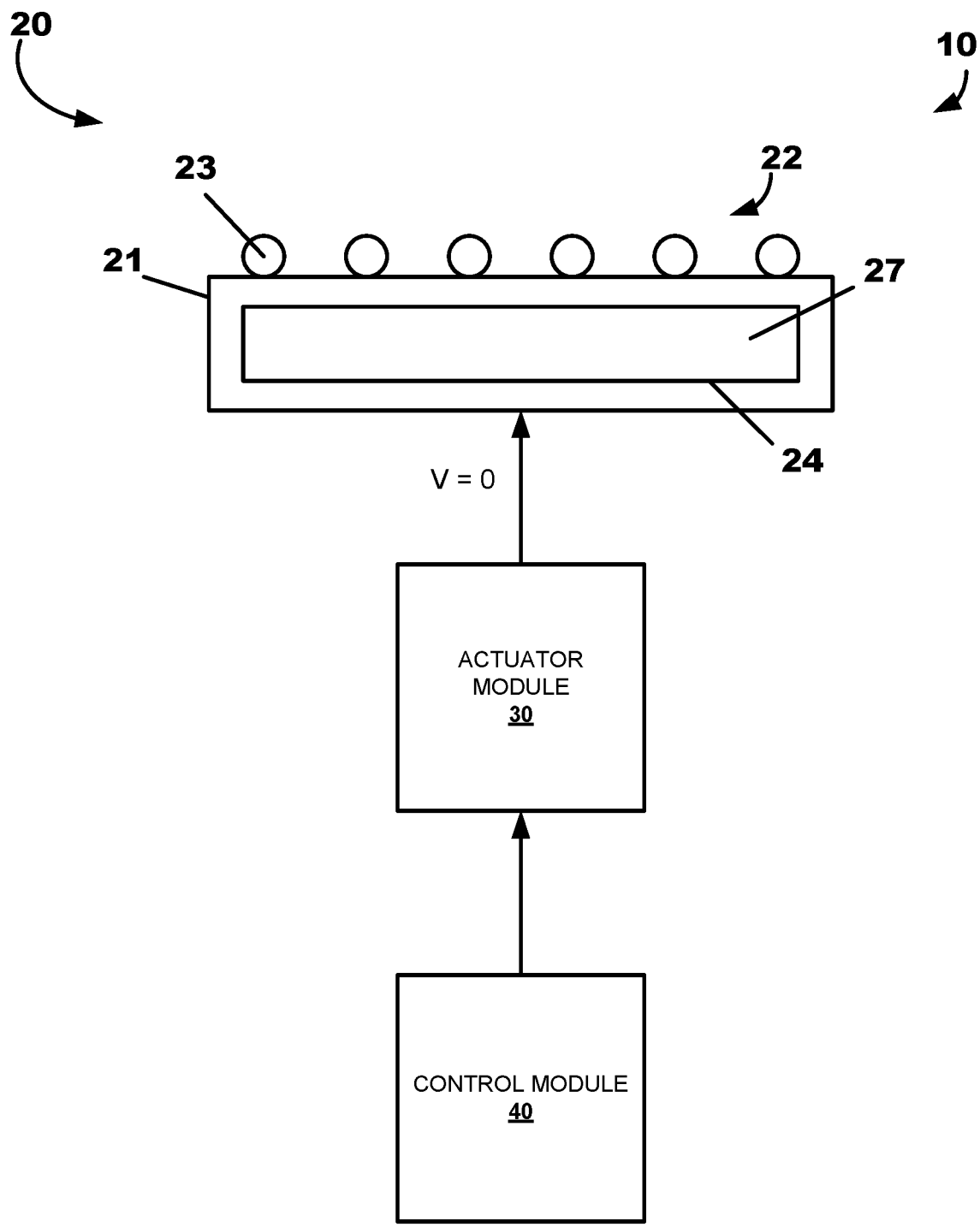
FIG. 1 illustrates an example tunable optical metamaterial system with the substrate in an inactive state, in accordance with one or more embodiments shown and described herein.
Figure 2:
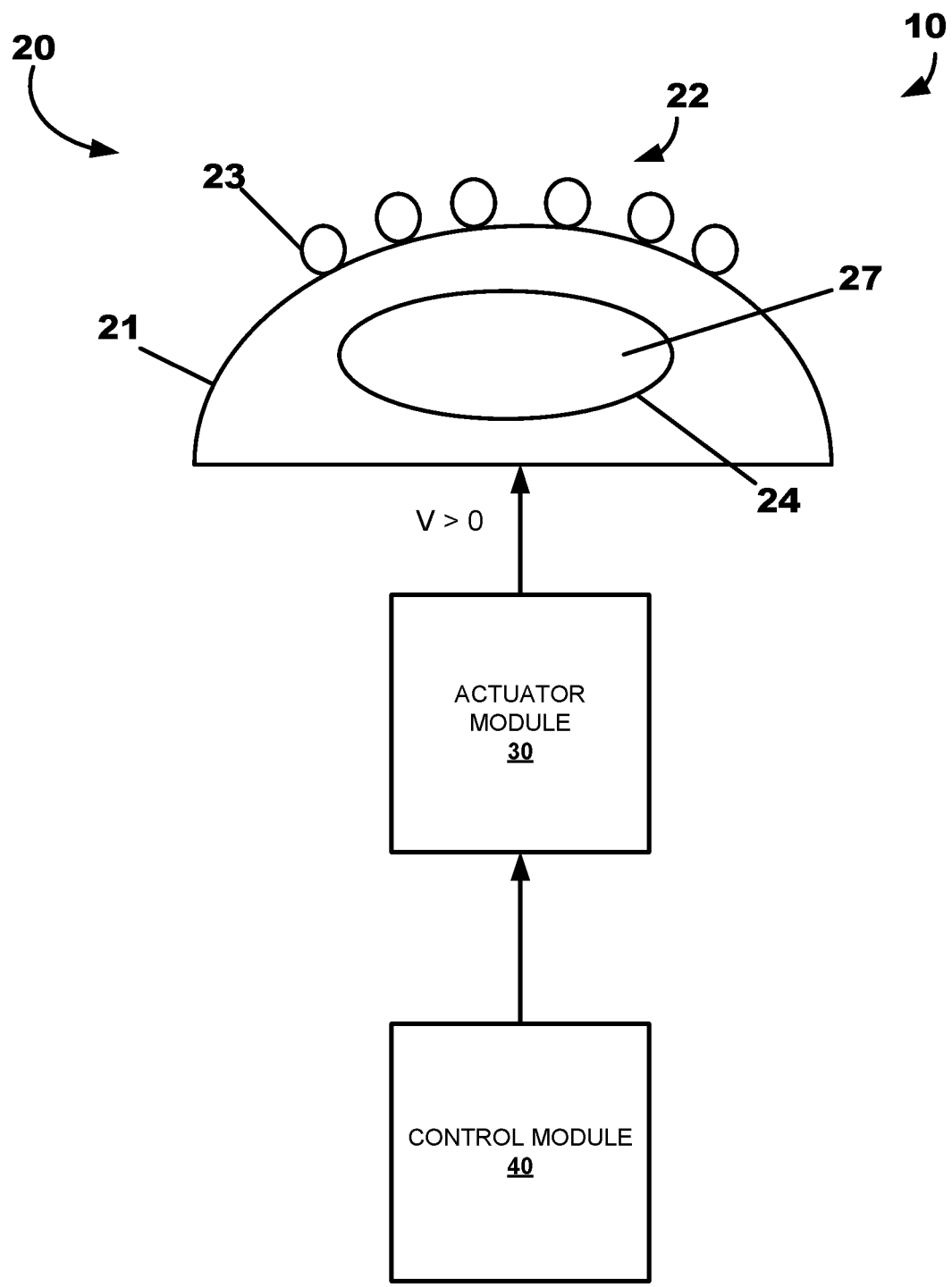
FIG. 2 illustrates the example tunable optical metamaterial system of FIG. 1, with the substrate in an active state.
Figure 3:
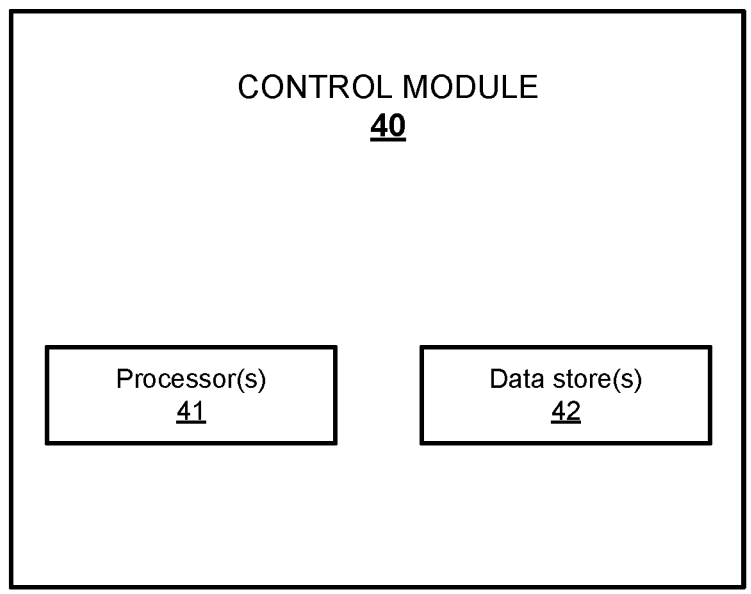
FIG. 3 illustrates an example control module of the example tunable optical metamaterial system of FIG. 1.

Turning to the figures, in which FIGS. 1 and 2 illustrates an example tunable optical metamaterial system 10 that may have application in a vehicle component, system, or subsystem. Embodiments, however, are not limited thereto, and thus, this disclosure contemplates the tunable optical metamaterial system 10 having non-mobility applications that fall within the spirit and scope of the principles of this disclosure.

In the illustrated example of FIGS. 1 and 2, the example tunable optical metamaterial system 10 comprises a tunable optical metamaterial 20, an actuator module 30 to selectively activate the tunable optical metamaterial 20, and a control module 40 to selectively control the actuator module 30. In FIG. 1, the substrate 21 is in an inactive state (i.e., V=0), whereas in FIG. 2, substrate 21 is in an active state (i.e., V>0).

In accordance with one or more embodiments, the tunable optical metamaterial 20 comprises a substrate 21 that is coupled in an electrically conductive manner to a voltage source or a pressure source, and one or more optically active arrays 22 comprising a plurality of optically active resonators 23 that are populated on the electroactive surface in a spaced-apart configuration.

In the illustrated example of FIGS. 1, 2, 4, and 5, the substrate 21 is defined by one or more fluid-filled pockets 24 defining an interior volume that serves as a reservoir 27 to contain a fluid. Although the illustrated examples set forth fluid-filled pockets 24 having a plurality of optically active resonators 23, embodiments are not limited thereto. This disclosure contemplates other suitable configurations that fall within the spirit and scope of the principles of this disclosure. For example, but not limited thereto, the fluid-filled pockets 24 may have a single optically active resonator 23 (See, FIGS. 4 and 5).

The substrate 21 is composed of a deformable and electroactive material such as, for example, a transparent electroactive polymer (EAP), such as, for example, Solvene® 200. The EAP polymer of the substrate 21 may be formed by a spin-coating technique, but embodiments are not limited thereto. This disclosure contemplates other suitable techniques that fall within the spirit and scope of the principles of this disclosure. For example, but not limited thereto, the substrate 21 may be formed by injection molding, casting, or a polymer thin film method.

In one or more example embodiments, the fluid-filled pockets 24 are formed by a first layer 25 and a second layer 26 connected to the first layer to define the reservoir 27. In one or more example embodiment, the first layer 25 comprises an electroactive polymer (EAP), and the second layer 26 comprises a non-EAP. In one or more example embodiments, both the first layer 25 and the second layer 26 of the substrate 21 comprises an electroactive polymer (EAP).

Figure 4:
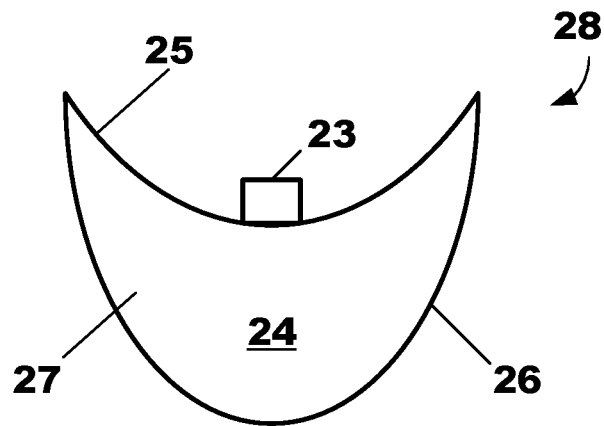
FIG. 4 illustrates an example unit cell in an inactive state for the example tunable optical metamaterial system of FIG. 1.

In the illustrated example of FIG. 4, which illustrates a unit cell 28 of the tunable optical metamaterial 20, the first layer 25 has a concave configuration and the second layer 26 has a convex configuration in an inactive state of the substrate 21. In accordance with one or more embodiments, each unit cell 28 in the one or more optically active arrays 22 may have the same structural configuration or have different structural configurations. In accordance with one or more embodiments, depending on the orientation and deployment of the unit cell 28, each unit cell 28 in the one or more optically active arrays 22 may be independently turned on and off as a light diffuser or beam focusing structure.

Figure 5:
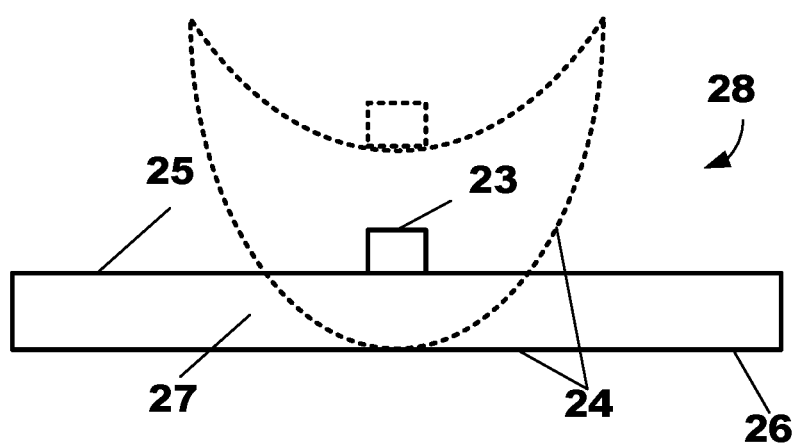
FIG. 5 illustrates an example unit cell in an active state for the example tunable optical metamaterial system of FIG. 1.

In the illustrated example of FIG. 5, when the substrate 21, i.e., the one or more fluid-filled pockets 24, is activated to an active state, the one or more fluid-fill pockets 24 defined by the first layer 25 and the second layer 26 is induced to a change in volumetric configuration or 3D orientation. In particular, application of current through conductors of the actuator module 30 causes stretching or expansion of the electroactive first layer 25, thereby causing the fluid-filled pockets 24 to alter its volumetric configuration or 3D orientation from a crescent-shape (FIG. 4) to a substantially rectangular-shape (FIG. 5). In FIG. 5, the position of the fluid-filled pocket 24 of a unit cell 28 between the active state and indicate states is indicated by the hatched lines.

The substrate 21 may have one or more electrical conductor members or electrodes arranged thereon or therein to establish one or more electrically conductive interfaces between the substrate 21 and the actuator module 30. Such electrically conductive interfaces are configured to facilitate electrical activation or stimulation of the substrate 21 by application of a predetermined one or more voltages via the actuator module 30, in a manner that changes the volumetric configuration or 3D orientation of the one or more fluid-filled pockets 24. In one or more example embodiments, the application of the predetermined one or more voltages may cause the one or more fluid-filled pockets 24 to expand in a direction dependent upon an orientation of polymer fibers of the EAP of the substrate 21. The change in configuration of the one or more fluid-filled pockets 24, in turn, induces an optical response by the optically active particle array 22.

By consequence, the change in volumetric configuration or 3D orientation of the one or more fluid-filled pockets 24 caused by movement of the one or more fluid-filled pockets 24 between the activated state and the inactivated state, leads to a variation in optical response.

In accordance with one or more embodiments, the substrate 21, and particularly, each individual fluid-filled pocket 24, is coupled in an electrically conductive manner to a voltage source or in a hydraulic manner to a pressure source so as to selectively activate the fluid-filled pockets 24 and induce a change in volumetric configuration or 3D orientation that in turn produces an optical response. In one or example embodiments, an individual fluid-filled pocket 24 or a group (predetermined or randomly selected) of fluid-filled pockets 24 may be selectively activated while another fluid-filled pocket 24 or group of fluid-filled pockets 24 may remain in the inactive state in a manner that produces an optical response. In one or example embodiments, the voltage or pressure received by each individual fluid-filled pocket 24 is variable in a manner that that produces an optical response.

Alternatively or additionally, one or more fluid-filled pockets 24 may be selectively activated in a manner that induces a symmetric change in volumetric configuration or 3D orientation of the one or more fluid-filled pockets 24. For example, each individual fluid-filled pocket 24 may have the same change in volumetric configuration or 3D orientation in a manner that produces a specific optical response.

Alternatively or additionally, one or more fluid-filled pockets 24 may be selectively activated in a manner that induces an asymmetric change in volumetric configuration or 3D orientation of the one or more fluid-filled pockets 24. For example, the fluid-filled pockets 24 may have different changes in volumetric configuration or 3D orientation in a manner that produces a specific optical response.

The optically active resonators 23 comprise a metasurface that is configured to allow for phase control over light on the nanoscale. In accordance with one or more embodiments, the metasurface is formed from a cylinder. In accordance with one or more embodiments, the metasurfaces may be formed from high refractive index materials, such as, for example, $TiO_2$, $HfO_2$, and AlN. The material composition of the metasurface has an influence its phase. Such high refractive index materials may be deposited using atomic layer deposition (ALD) techniques, and can be etched via reactive ion etching (RIE) to obtain a pillar-like shape of the optically active resonators 23.

In accordance with one or more embodiments, the metasurfaces comprise one or more metal resonator nanoparticles. Alternatively or additionally, the metasurfaces comprise one or more inorganic resonator particles. Alternatively or additionally, the metasurfaces comprise one or more organic resonator particles (e.g., such as PDTT:PSS). Embodiments, however, are not limited thereto, and thus, this disclosure contemplates the tunable optical metamaterial system 10 having non-mobility applications that fall within the spirit and scope of the principles of this disclosure.

In accordance with one or more embodiments of the example tunable optical metamaterial system, the actuator module 30 comprises one or more electrical conductor members or electrodes electrically coupled to the corresponding one or more electrical conductors or electrodes at the electrically conductive interface(s) with the substrate 21.

In accordance with one or more embodiments, the control module 40 comprises one or more processors 41. As set forth, described, and/or illustrated herein, "processor" means any component or group of components that are configured to execute any of the processes described herein or any form of instructions to carry out such processes or cause such processes to be performed. The processors 41 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 41 may comprise at least one hardware circuit (e.g., an integrated circuit) configured to carry out instructions contained in program code. In embodiments in which there is a plurality of processors 41, such processors 41 may work independently from each other, or one or more processors may work in combination with each other. In accordance with one or more embodiments, the processors 41 may be a host, main, or primary processor of the system 10. For instance, the processors 41 may comprise an electronic control unit (ECU) of a vehicle.

In accordance with one or more embodiments, the control module 40 may comprise one or more data stores 42 for storing one or more types of data. The control module 40 may include interfaces that enable one or more systems thereof to manage, retrieve, modify, add, or delete, the data stored in the data stores 42. The data stores 42 may comprise volatile and/or non-volatile memory. Examples of suitable data stores 42 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 42 may be a component of the processors 41, or alternatively, may be operatively connected to the processors 41 for use thereby. As set forth, described, and/or illustrated herein, "operatively connected" may include direct or indirect connections, including connections without direct physical contact.

In accordance with one or more embodiments, the one or more processors 42 are configured to execute a set of instructions (which may be stored in the one or more data stores 42) to selectively control the optical properties of the tunable optical metamaterial 20 by causing the electrical activation of the fluid-filled pockets 24 in a manner that alters the spacing between the optically active resonators 23. In particular, the one or more processors 42 are configured to transmit one or more control signals to activate the actuator module 30, which in turn causes the actuator module 30 to selectively apply a suitable voltage to the substrate 21 in manner which changes or otherwise alters the volumetric configuration or 3D orientation of the one or more fluid-filled pockets 24, thereby generating an optical response by the optically active particle array 22.

In accordance with one or more embodiments, the one or more processors 41 may execute a set of instructions to transmit one or more control signals to the actuator module 30 to selectively cause electrical activation of the substrate 21 in a manner that induces an optical response by the optically active particle array 22. In particular, the one or more processors may execute the set of instructions to selectively cause the one or more electrical conductor members of the actuator module 30 to apply a predetermined one or more voltages to the electroactive surface in a manner that electrically activates the substrate 21. Such electrical activation may induce a change in volumetric configuration or 3D orientation of the one or more fluid-filled pockets 24 (via expansion of the substrate 21) to an active state (FIG. 2). Such an active state may represent a maximum overall size of the substrate 21.

In accordance with one or more embodiments, while the electrical activation of the substrate 21 is maintained, the one or more processors may also execute a set of instructions to transmit one or more control signals to the actuator module 30 to selectively cause electrical deactivation of the substrate 21 in a manner that induces another optical response by the optically active particle array 22. Such electrical deactivation may induce contraction of the substrate 21 to the inactive state (FIG. 1). Such an inactive state may represent a minimum overall size of the substrate 21.

In accordance with one or more embodiments, while the electrical activation of the substrate 21 is maintained, the one or more processors may also execute a set of instructions to transmit one or more control signals to the actuator module 30 to selectively cause a reduction in the electrical activation (i.e., by reducing the applied voltage) of the substrate 21 in a manner that induces another optical response by the optically active particle array 22. Such reduction in electrical activation may induce expansion of the substrate 21 to an active state (FIG. 2). Such an active state may represent an overall size of the substrate 21 that is between the maximum overall size and the minimum overall size.

In accordance with one or more embodiments, the application of a predetermined one or more voltages to the electroactive surface 24 of the substrate 21 may induce bidirectional or unidirectional expansion of the substrate 21 in a manner that causes an optical response by the optically active particle array 22. The bidirectional or unidirectional expansion of the substrate 21 can be dependent upon an orientation of the polymer fibers of the EAP. The application of a suitable voltage causes a shift in the optical properties of the optically active particle array 22, such as absorption and emission spectra.

Figure 6:
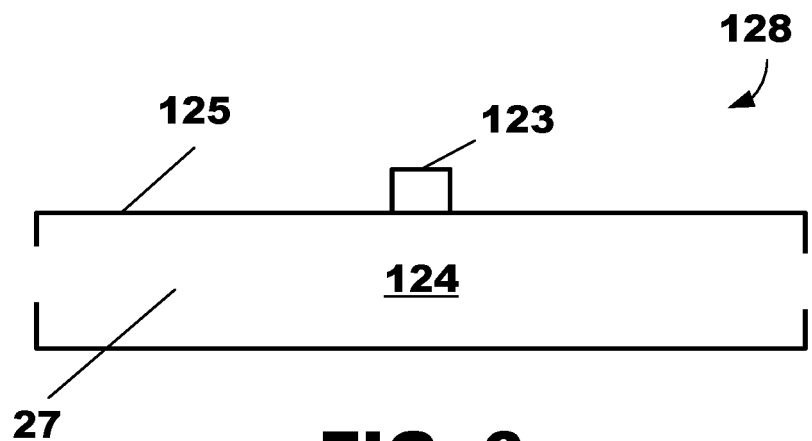
FIG. 6 illustrates fluid under no pressure for the example tunable optical metamaterial system of FIG. 1.
Figure 7:
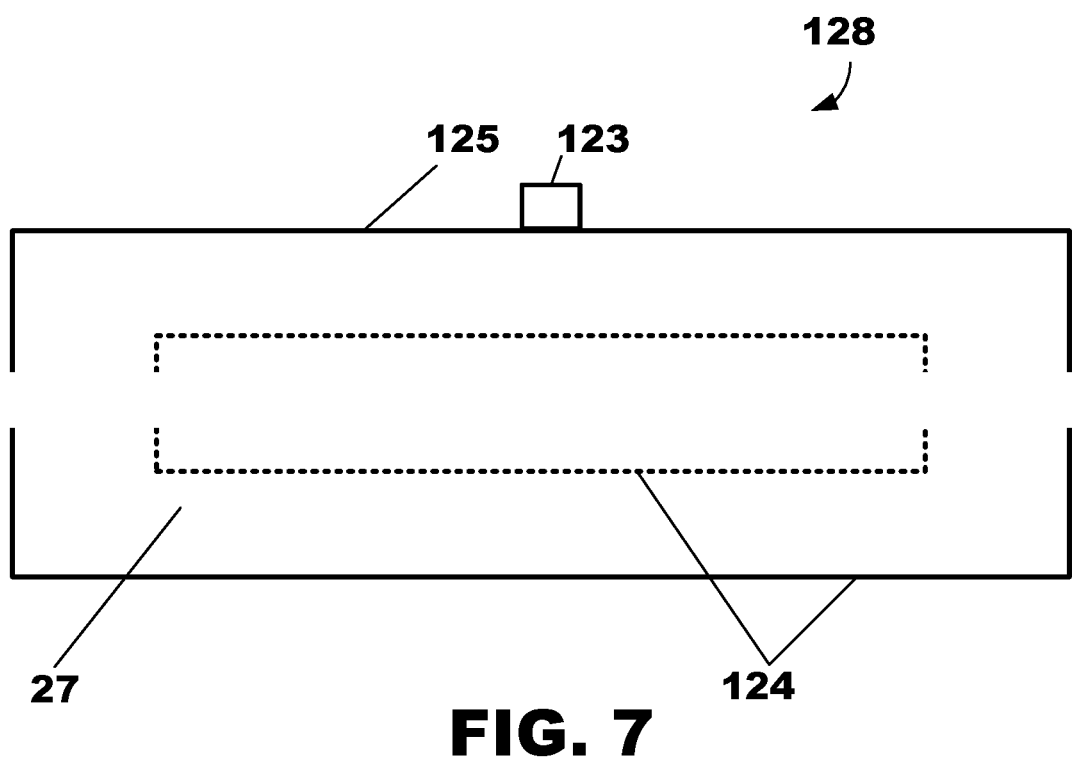
FIG. 7 illustrates fluid under pressure for the example tunable optical metamaterial system of FIG. 1.

In the illustrated example of FIGS. 6 and 7, alternatively, instead of having an electroactive substrate, one or more fluid-filled pockets 124 composed of a deformable polymer are fluidically coupled together (in series or in parallel) to form a fluid circuit facilitating a flow of a fluid between unit cells 128. The fluid circuit is coupled to an actuator module that comprises a pressure source such as, for example, one or more pumps, that is controlled by a control module to selectively apply pressure to the fluid circuit in a manner that induces a change in volumetric configuration or 3D orientation of each individual cell 128 between an inactive state (FIG. 6) in which the fluid is not under pressure to an active state (FIG. 7) in which the fluid is under pressure. The change in volumetric configuration or 3D orientation, in turn, induces an optical response by the optically active particle array. In FIG. 7, the position of the fluid-filled pocket 124 of a unit cell 128 between the active state and indicate states is indicated by the hatched lines.

In the illustrated examples of FIGS. 8 to 11, a flowchart of methods 800, 900, 1000, and 1100 of controlling a tunable optical metamaterial having a substrate defined by one or more fluid-filled pockets formed by one or more electroactive polymer (EAP) layers defining a reservoir containing a fluid that is induced to a change in volumetric configuration or 3D orientation when electrically activated, and an optically active array of resonators populated on a surface of the one or more fluid-filled pockets, the optically active array of resonators being optically responsive to the change in volumetric configuration or 3D orientation of the one or more fluid-filled pockets. In one or more examples, the respective flowcharts of the methods 800, 900, 1000, and 1100 may be implemented by the one or more processors 41. For example, the one or more processors 41 are configured to implement the methods 800, 900, 1000, and 1100 using logic instructions (e.g., software), configurable logic, fixed-functionality hardware logic, etc., or any combination thereof. In one or more examples, software executed by the control module 40 provides functionality described or illustrated herein. In particular, software executing by the one or more processors 41 is configured to perform one or more processing blocks of the methods 800, 900, 1000, and 1100 set forth, described, and/or illustrated herein, or provides functionality set forth, described, and/or illustrated.

Figure 8:
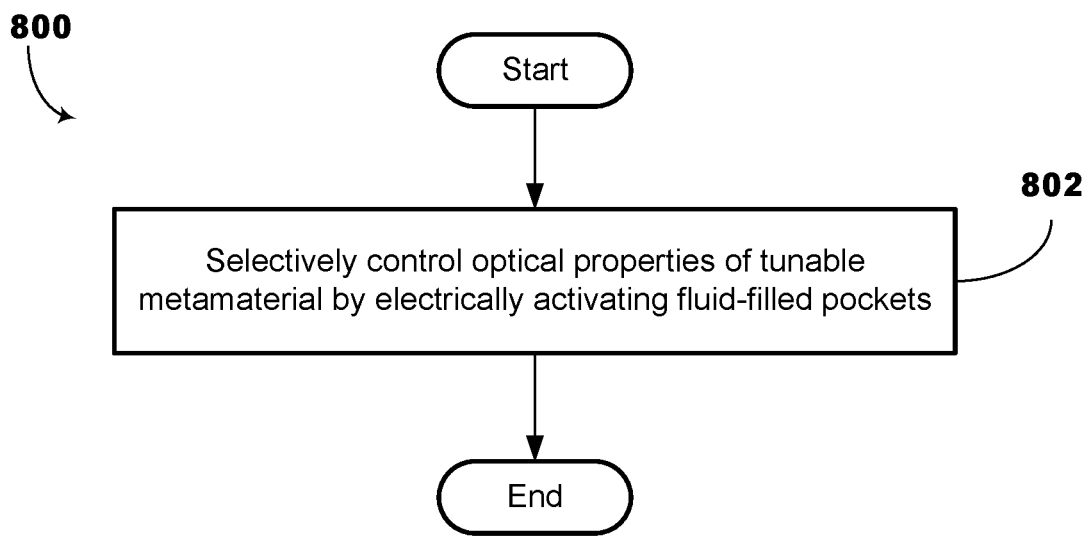
FIGS. 8 through 11 respectively illustrate a schematic diagram of example methods of controlling a tunable optical metamaterial, in accordance with one or more embodiments shown and described herein.
Figure 9:
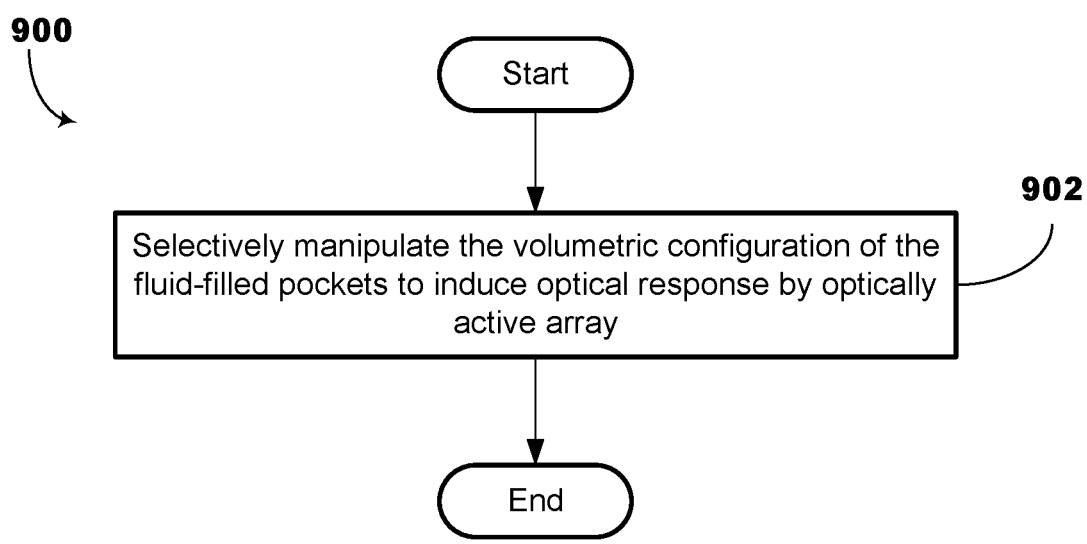

In the illustrated example of FIG. 8, illustrated process block 802 includes selectively controlling the optical properties of the tunable optical metamaterial by causing the electrical activation of the fluid-filled pockets. Such electrical activation induces a change in volumetric configuration or 3D orientation of the fluid-fill pockets, which in turn, induces an optical response by the optically active array. The method 800 may terminate or end after execution of process block 802. selectively control the optical properties of the tunable optical metamaterial In the illustrated example of FIG. 9, illustrated process block 902 includes selectively manipulating the volumetric configuration or 3D orientation of the fluid-filled pockets in a manner that induces an optical response by the optically active array. The method 900 may terminate or end after execution of process block 902.

Figure 10:
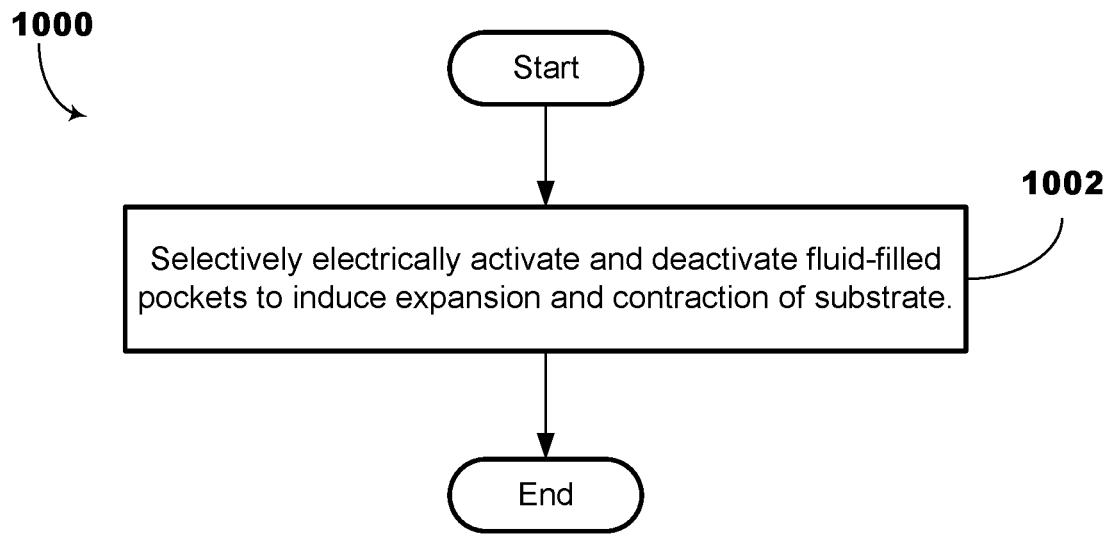

In the illustrated example of FIG. 10, illustrated process block 1002 includes selectively causing electrical activation and deactivation of the fluid-filled pockets to induce expansion and contraction of the substrate and thereby induce an optical response by the optically active array. The method 1000 may terminate or end after execution of process block 1002.

Figure 11:
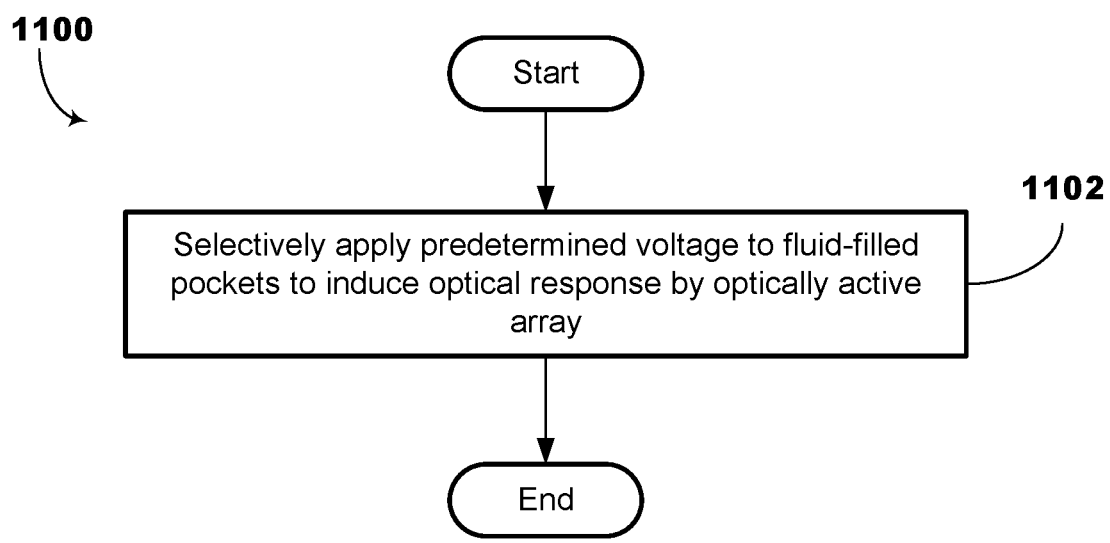

In the illustrated example of FIG. 11, illustrated process block 1102 includes selectively applying a predetermined one or more voltages to the electroactive surface of the fluid-filled pockets in a manner that induces an optical response by the optically active array. The method 1000 may terminate or end after execution of process block 1102.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A tunable optical metamaterial system, comprising:
a tunable optical metamaterial having a substrate defined by one or more fluid-filled pockets formed by one or more electroactive polymer (EAP) layers defining a reservoir containing a fluid that is induced to a change in volumetric configuration when electrically activated, and an optically active array of resonators populated on a surface of the one or more fluid-filled pockets, the optically active array of resonators being optically responsive to the change in volumetric configuration of the one or more fluid-filled pockets;
a control module, including one or more processors to execute a set of instructions to:
selectively control the optical properties of the tunable optical metamaterial by causing the electrical activation of the fluid-filled pockets.

2. The tunable optical metamaterial system of claim 1, further comprising an actuator module electrically connected to the one or more fluid-filled pockets, to serve as a voltage source which electrically activates the one or more fluid-filled pockets.

3. The tunable optical metamaterial system of claim 2, wherein the one or more processors are to execute the set of instructions to selectively cause the actuator module to apply a predetermined one or more voltages to electrically activate the one or more fluid-filled pockets.

4. The tunable optical metamaterial system of claim 2, wherein the one or more processors are to execute the set of instructions to selectively cause the actuator module to apply the predetermined one or more voltages to expand the one or more fluid-filled pockets in a direction dependent upon an orientation of polymer fibers of the EAP.

5. The tunable optical metamaterial system of claim 1, the one or more fluid-filled pockets are formed by an electroactive polymer layer and a non-electroactive polymer layer.

6. The tunable optical metamaterial system of claim 5, wherein in an inactive state of the electroactive polymer layer:
the electroactive polymer layer has a concave configuration; and
the non-electroactive polymer layer has a convex configuration.

7. The tunable optical metamaterial system of claim 6, wherein in an active state of the electroactive polymer layer:
the concave configuration is altered to a substantially planar configuration, and
the convex configuration is altered to a substantially planar configuration.

8. A tunable optical metamaterial, comprising:
a substrate defined by one or more fluid-filled pockets formed by one or more electroactive polymer (EAP) layers defining a reservoir containing a fluid that is induced to a change in volumetric configuration when electrically activated; and
an optically active array of resonators populated on a surface of the one or more fluid-filled pockets, the optically active array of resonators being optically responsive to the change in volumetric configuration of the one or more fluid-filled pockets.

9. The tunable optical metamaterial of claim 8, wherein the one or more fluid-filled pockets are electrically activated by receipt of a predetermined one or more voltages from a voltage source.

10. The tunable optical metamaterial of claim 9, wherein the application of the predetermined one or more voltages causes the one or more fluid-filled pockets to expand in a direction dependent upon an orientation of polymer fibers of the EAP.

11. The tunable optical metamaterial of claim 8, wherein the one or more fluid-filled pockets are formed by an electroactive polymer layer and a non-electroactive polymer layer.

12. The tunable optical metamaterial of claim 11, wherein in an inactive state of the electroactive polymer layer, the electroactive polymer layer has a concave configuration.

13. The tunable optical metamaterial of claim 12, wherein in an inactive state of the electroactive polymer layer, the non-electroactive polymer layer has a convex configuration.

14. The tunable optical metamaterial of claim 13, wherein in an active state of the electroactive polymer layer:
the concave configuration is altered to a substantially planar configuration, and
the convex configuration is altered to a substantially planar configuration.

15. A method of controlling a tunable optical metamaterial, the method comprising:
forming the tunable optical metamaterial having a substrate defined by one or more fluid-filled pockets formed by one or more electroactive polymer (EAP) layers defining a reservoir containing a fluid that is induced to a change in volumetric configuration when electrically activated, and an optically active array of resonators populated on a surface of the one or more fluid-filled pockets, the optically active array of resonators being optically responsive to the change in volumetric configuration of the one or more fluid-filled pockets; and
selectively controlling the optical properties of the tunable optical metamaterial by causing the electrical activation of the fluid-filled pockets.

16. The method of claim 15, wherein the selective control of the optical properties comprises applying a predetermined one or more voltages to the one or more electroactive polymer (EAP) layers in a manner that electrically activates the one or more fluid-filled pockets.

17. The method of claim 16, wherein the application of the predetermined one or more voltages causes the one or more fluid-filled pockets to expand in a direction dependent upon an orientation of polymer fibers of the EAP.

18. The method of claim 15, wherein the one or more fluid-filled pockets are formed by an electroactive polymer layer and a non-electroactive polymer layer.

19. The method of claim 18, wherein, in an inactive state of the electroactive polymer layer:
the electroactive polymer layer has a concave configuration, and
the non-electroactive polymer layer has a convex configuration.

20. The method of claim 18, wherein in an active state of the electroactive polymer layer:
the concave configuration is altered to a substantially planar configuration, and
the convex configuration is altered to a substantially planar configuration.

* * * * *